United States Patent [19]

Patrick et al.

[11] Patent Number: 5,238,357
[45] Date of Patent: Aug. 24, 1993

[54] BULK MATERIALS TRANSPORTATION SYSTEM

[75] Inventors: Kenneth J. Patrick, Medfield, Mass.; Jerald R. Tinsman, Farmland, Ind.

[73] Assignee: Intermodal Technologies, Inc., Nashua, N.H.

[21] Appl. No.: 757,444

[22] Filed: Sep. 10, 1991

Related U.S. Application Data

[62] Division of Ser. No. 440,314, Nov. 22, 1989, Pat. No. 5,078,560.

[51] Int. Cl.⁵ .............................................. B65G 67/00
[52] U.S. Cl. .................................. 414/420; 220/1.5; 414/411; 414/642; 414/704; 414/697; 206/596
[58] Field of Search ............... 206/596, 597; 220/1.5; 105/377; 410/52, 54, 68, 71; 414/391, 408, 419, 411, 420, 421, 425, 607, 632, 634, 635, 642, 685, 697, 704, 706, 716, 718

[56] References Cited

U.S. PATENT DOCUMENTS

| | | | |
|---|---|---|---|
| 1,807,268 | 5/1931 | Woodruff | 410/54 |
| 2,664,219 | 12/1953 | Schmidt | 206/596 X |
| 3,086,669 | 4/1963 | Rogers et al. | 414/470 |
| 3,130,846 | 4/1964 | Wender | 414/408 |
| 3,167,195 | 1/1965 | Jensen et al. | 414/408 X |
| 3,305,118 | 2/1967 | Lull | 414/718 X |
| 3,318,473 | 5/1967 | Jones et al. | 206/596 X |
| 3,327,879 | 6/1967 | Lull | 414/718 X |
| 3,552,325 | 1/1971 | Enochian | 410/54 |
| 3,561,621 | 2/1971 | Rivers, Jr. | 414/347 X |
| 3,623,631 | 11/1971 | Ford | 206/596 X |
| 3,643,993 | 2/1972 | Asadurian | 414/408 X |
| 3,704,754 | 12/1972 | Layton | 414/697 X |
| 3,805,709 | 4/1974 | Schuller et al. | 410/54 |
| 3,884,378 | 5/1975 | Muellner | 414/706 |
| 3,935,953 | 2/1976 | Stedman | 414/697 |
| 3,937,339 | 2/1976 | Geis et al. | 414/672 |
| 3,968,895 | 7/1976 | Barnes, Jr. et al. | 206/596 X |
| 4,019,635 | 4/1977 | Boots | 206/596 |
| 4,036,383 | 7/1977 | Allen | 414/420 |
| 4,046,026 | 9/1977 | Mammarstrand | 414/697 X |
| 4,219,300 | 8/1980 | McMillan | 414/420 |
| 4,272,217 | 6/1981 | Sefcik | 414/718 X |
| 4,354,781 | 10/1982 | Roberts | 410/68 X |
| 4,422,814 | 12/1983 | Borders | 414/420 X |
| 4,486,141 | 12/1984 | Pescarmona | 414/697 |
| 4,547,118 | 10/1985 | Pittenger | 414/685 X |
| 4,552,500 | 11/1985 | Ghibaudo et al. | 414/408 |
| 4,699,557 | 10/1987 | Barnes | 414/408 |
| 4,715,767 | 12/1987 | Edelhoff et al. | 414/408 |
| 4,756,425 | 7/1988 | Wise | 206/596 X |
| 4,806,061 | 2/1989 | Fenton | 414/529 X |
| 4,825,778 | 5/1989 | Riley | 410/54 X |
| 4,826,474 | 5/1989 | Holmes | 414/697 X |

FOREIGN PATENT DOCUMENTS

| | | | |
|---|---|---|---|
| 1217727 | 3/1986 | U.S.S.R. | 414/420 |
| 1463560 | 3/1989 | U.S.S.R. | 414/480 |
| 253021 | 6/1926 | United Kingdom | 410/68 |

OTHER PUBLICATIONS

Product Brochure, CAT 992C Wheel Loader, Caterpillar, Inc.
Product Brochure, CAT 988B Wheel Loader Caterpillar, Inc.
Product Brochure, CAT IT28B Integrated Tool Carrier, Caterpillar.
Product Brochure, IT18 Integrated Tool Carrier, Caterpillar, Inc.

Primary Examiner—Michael S. Huppert
Assistant Examiner—James T. Eller, Jr.
Attorney, Agent, or Firm—Dike, Bronstein, Roberts & Cushman

[57] ABSTRACT

An intermodal transportation system for hauling bulk materials, particularly municipal solid waste, by rail and truck utilizes multiple rectangular, open-top boxes each having a removable lid. The system includes a forklift with an articulated frame actuated by hydraulics which engages channels formed in the box or in the lid. Lock bars on the box are clamped by locking members carried on the forklift to hold the box on the forks during an over-the-side dumping movement. The forklift empties the box with a roll-out motion combining a forward rotation of a lifted box with a backward movement of the box. A reinforced flatbed railcar receives up to four 21 foot long boxes and lids with a total carrying capacity of up to 100 tons. Each car contains upright corners that guide the boxes onto the railroad car and then restrain it. The containers are flush with the upper surface of the railroad car when engaged in the corners. A tractor trailer with a tilt-up roller bed and winch hauls the boxes on highways.

7 Claims, 11 Drawing Sheets

BULK MATERIALS TRANSPORTATION SYSTEM

This application is a division of application Ser. No. 07/440,314 filed Nov. 22, 1989, now U.S. Pat. No. 5,078,560.

BACKGROUND OF THE INVENTION

This invention relates in general to transportation systems and in particular to an intermodal railway system utilizing closed containers to carry bulk materials, particularly municipal solid waste, by truck and rail.

The disposal of municipal solid waste (MSW) such as common garbage and trash as well as sludge produced by water treatment facilities is becoming an increasingly important and difficult problem as landfilled sites convenient to urban centers are becoming full and environmental protection concerns are foreclosing the ocean dumping of solid refuse. At present, the most common MSW disposal system is to simply haul the MSW by tractor (transfer) trailer from an urban collection point or treatment plant to a landfill. Given the capital cost of a "transfer trailer" and typical current operating costs per mile for a typical 22 ton load, currently there is approximately a 300 mile one way haul distance limit on economically feasible disposal sites.

Because the tonnage that can be hauled by truck in a single load is limited by highway and bridge laws, the cost of transporting bulk waste by truck is inherently limited as to its volume and weight. While railroads can carry larger loads, measured both in volume and in weight, over long distances, to date efforts to use railway cars for hauling low value bulk materials, particularly loose MSW, has proven to be financially uneconomical. At present there is substantially no use of railroads to haul municipal solid waste. Indeed, at present the maximum payload that is carried by any standard railway car is about 60 tons, regardless of the type of car or the nature of its load.

One known approach to utilizing railroads for bulk transportation is a convertible trailer which has detachable rail wheels and specialized interconnections so that the highway trailer can be converted into a railroad car. An example of this type of unit is a product sold by the Thrall Car Company under the trade designation "Roadrailer". While the system has found some market for hauling high value items, it is not economical for transportation of bulk materials. The detachable wheels and special interconnection systems to convert the "transfer trailer" into a "railroad car" significantly increases the capital cost of each unit required to transport a given weight, e.g., the 22 tons normally carried by a "transfer trailer" when hauling MSW. Also, the converted "cars" do not operate in conjunction with existing railroad service; they must operate as a complete train and there is currently in the U.S. a required minimum shipment level of 60 units. Further, charges for railway transport of a single "car" of this type carrying 22 tons is equivalent to that of a single railway car operating in a "piggy back" mode carrying approximately twice the payload.

Well known transportation systems utilizing railways also include the use of dedicated railway car such as box cars, gondolas, and hoppers. Such cars have a long-standing history in transporting loose bulk materials such as coal, ores, ash, sludge, salt, and grain products. One major problem, however, is the loading and unloading of the bulk material from the car. If the cars are not open topped, loading through side doors is inherently difficult for a loose bulk material. If the car has an open top, loading may be simple, but unloading can still be a problem.

Certain loads can be removed with a clamshell scoop, but this process is slow and has significant capital costs. Another solution is movable openings or doors such as a "walking floor" or the conventional "push out" system. These techniques, while being perhaps the fastest, nevertheless, if installed require about 10 minutes to complete the unloading of one car. To date, no one has built and used commercially such a "push out"/"walking floor" rail car. Moreover, whenever there are moving parts there is liquid leakage, buckling of the door or other closure, latching requirements, and the possibility of malfunction. Another approach is simply to lift and dump an entire railroad car. While this system is obviously fast and effective, it also requires a substantial capital investment. With an installation presently costing close to $1 million for MSW disposal, each landfill would need a railroad line and one of these installations. Further, box cars or open top cars which have doors or other removable openings which are hinged and/or latched experience problems in that they leak, the doors buckle, and the doors can open unintentionally losing material or presenting a hazard to personnel working with the cars.

Open top cars also have other problems. The material can be blown out of the car. Rain and contaminants can enter the car directly spoiling the contents if they are not waste products or, if they are waste products, adding to the liquid contained in the car which may present a leaking or odor problem. Sabotage, theft and spontaneous combustion (a special concern when transporting bulk combustibles such as coal which produces coal dust) are other problems that appear depending on the nature of the material transported. One common solution is simply to cover the open car with a tarpaulin, but tarpaulins are frequently lost or break free in transit. These conditions allow a loss of the material being carried and all of the other problems noted above. Further, tarpaulins require personnel time to install and remove them.

Still another approach, intended principally to control the loss of material due to the wind during transport, has been to bail the MSW or other loose bulk material prior to loading it into the cars. However, it typically requires 8 to 12 hours to load the bails into a car and another 8 to 12 hours to remove them, plus the cost of bailing.

A general problem with all specialized railroad cars is that they are not intermodal, that is, the railroad car cannot move on the highway. Therefore unless the railroad car can be brought directly to a loading facility, the entire system requires that conventional trucks be loaded and haul the material to a loading site at a railroad terminal. This therefore involves the cost of truck hauling as well as the personnel and capital cost for equipment to load and unload the MSW or other bulk material to and from the trailer, and then the railroad car.

Flatbed railway cars carrying trailers ("TOFC"-Trailer-on-Flatcar), or what is commonly termed "piggy back" systems, attempt to provide an intermodal transportation system using rail. In this system, typically two trailers are loaded onto a single flatbed car to provide a total carrying weight of approximately 44 tons. While this avoids loading and unloading of the material from the trailer, this arrangement is nevertheless comparatively costly and time consuming. It is necessary to have special TOFC cars, special terminals equipped to load and unload the trailers from the cars, and once the trailers are loaded, they are typically in-transit for 10 days, compared to a typical intransit time to 2 days if the trailer is operated on the highways. Since the capital cost of two trailers is substantial (currently about $90,000), this extra 8 days period of inactivity itself represents a considerable cost increase. More generally, TOFC is a system limited by the load carrying capacity of highway vehicles, which in turn are limited by highway and bridge limitations. It does not take full advantage of the weight and volume capacity of traditional railroad equipment. Therefore TOFC systems have proven useful principally for transporting high value food and manufactured materials, but have not been used for transporting low value bulk materials such as MSW.

Container-on-flatcar ("COFC") systems are also currently in use to provide intermodal transportation. Special containers carry goods on trucks and are then moved onto COFC cars. However, COFC containers heretofore have required special four-corner, personnel-activated restraints which space the containers approximately 9 inches above the deck of the flat car. This has a disadvantage in that it produces extreme pressure points on the deck coincident with the points of support of the containers. Also the force of the wind, particularly when the train is moving, acts under the containers and produces a force that tends to lift the containers from the car. Known COFC systems could reach a maximum pay load of 60 tons for railcar, as compared to typically pay load of 44 tons for TOFC carrying two trailers, but COFC systems do not provide the volume, weight and loading/unloading advantages to make them economically advantageous for bulk material transport. Also, currently available systems are not readily adapted to the rapid, convenient and low cost loading and unloading of bulk materials. They are not open-topped and they have doors or other movable closures with latches.

It is therefore a principal object of the present invention to provide a transportation system for loose bulk materials, particularly low value, loose, municipal solid waste, which is cost effective for these materials in terms of capital and operating costs.

Another principal object of the invention is to provide an intermodal loading system which provides an extremely rapid and complete unloading of the bulk material without fixed capital intensive equipment such installations to dump entire railway cars.

A further object of the invention is to provide the foregoing advantages while avoiding a loss of bulk material intransit and reliable resistance to penetration of moisture or other liquids to the material.

A further object of the invention is to provide a transportation system with the foregoing advantages which also prevents the leakage of liquids from the system.

Yet another object of the invention is to provide a system with the foregoing advantages which utilizes no doors, hinges, walking floors, or more generally, any openings in the side or bottom of the vehicle or container holding the bulk material.

Yet another object of the invention is to provide a transportation system that makes the hauling of loose bulk materials, particularly low value materials such as MSW, by railway economically competitive with existing systems.

Yet another object of the present invention is to provide a system with the foregoing advantages which can carry volume and tonnages per railway car higher than heretofore known.

Still another object of the invention is to provide a bulk materials transport system which is rugged, reliable, and extremely simple to use.

A further object of the invention is to provide a bulk transport system which is highly resistant to spontaneous combustion, sabotage, or theft.

A still further object of the invention is to provide intermodal bulk material transport system which is highly crash resistant and provides a low clean up exposure.

Another object of the invention is to provide an intermodal transport system for bulk materials which is sufficiently cost effective, including capital and operating cost as measured by cost per ton per mile transported, that remote and heretofore unusable waste disposal sites become available.

SUMMARY OF THE INVENTION

Bulk material, such as municipal solid waste (MSW), is transported in a plurality of rigid, open-top boxes having a bottom wall and four side walls interconnected to one another as by welding, to form a water tight container with high structural strength sufficient to withstand loads of up to 35 tons, but which are typically 22 tons. Each box has reinforcing ribs or equivalent mechanical enforcement of its side walls to resist the forces produced by the weight of the material held in the boxes. Each box has a lid, preferably formed with an overhanging skirt, which seats over the open top of the box and prevents rain or other liquids from entering the box. The lid preferably rests on a sill or engages the top edge of the box to provide a mechanical seal of the box and to control wind lift of the lid from the box during transport. Each box and each lid has a pair of hollow fork channels or pockets formed in them and extending generally horizontally with an access opening at at least one side wall. Each box also contains at least one gripping member, such as a rod or bar, mounted on at least one side wall.

Each box is manipulated and dumped by a forklift that includes a tractor, an articulated frame assembly mounted on the tractor, and at least one and preferably a pair of forks mounted at the free end of the frame assembly. A hydraulic system actuates the frame to execute lifting movement which raises and lowers a box and/or lid carried on the forks, rakes backwardly approximately 15° to shift the center of gravity of a loaded box over the tractor to provide better stability, and produces a "roll-out" action characterized by a rotation through at least 90°, and preferably 150° to dump the contents of the box with at least a 45° downward incline. In coordination with this 150° dumping rotation the frame assembly and hydraulic system also moves the box toward the tractor. The "over the side" dumping using an open top container manipulated by a forklift is considered unique for handling loose bulk materials in large volumes. The forklift preferably also includes a hydraulicly actuated lock or locks which engages the gripping member or members on the box to secure the box on the forks during the forward roll-out movement.

A bulk materials transportation system of the present invention also includes a reinforced flatbed car capable of carrying payloads of 100 tons equivalent to four boxes and lids each loaded with 22 tons of bulk material.

To locate and restrain the boxes when they are loaded on the flatcar, funnel-topped corners are welded to the upper deck of the flatcar for each box. The corners each extend upright from the deck, have an L shaped cross section, and preferably have an outwardly flared geometry at at least their upper portions. The bottom wall of the box is flush with the upper surface of the deck when the box is seated within the corners. A tractor trailer with a tilt up roller bed and winch hauls the boxes on highways.

These and other features and objects of the invention will be readily understood from the following detailed description of the preferred embodiments which should be read in light of the accompanying drawings.

BRIEF DESCRIPTION OF THE DRAWINGS

FIG. 11A shows the forklift engaged to lift the box from the ground, FIG. 11B shows the box raised, and raked back for travel, FIG. 11C shows the forklift rolled out to a horizontal orientation, and FIG. 11D shows the forklift rolled out further to a full dump position;

DETAILED DESCRIPTION OF THE PREFERRED EMBODIMENTS

Figure 1:
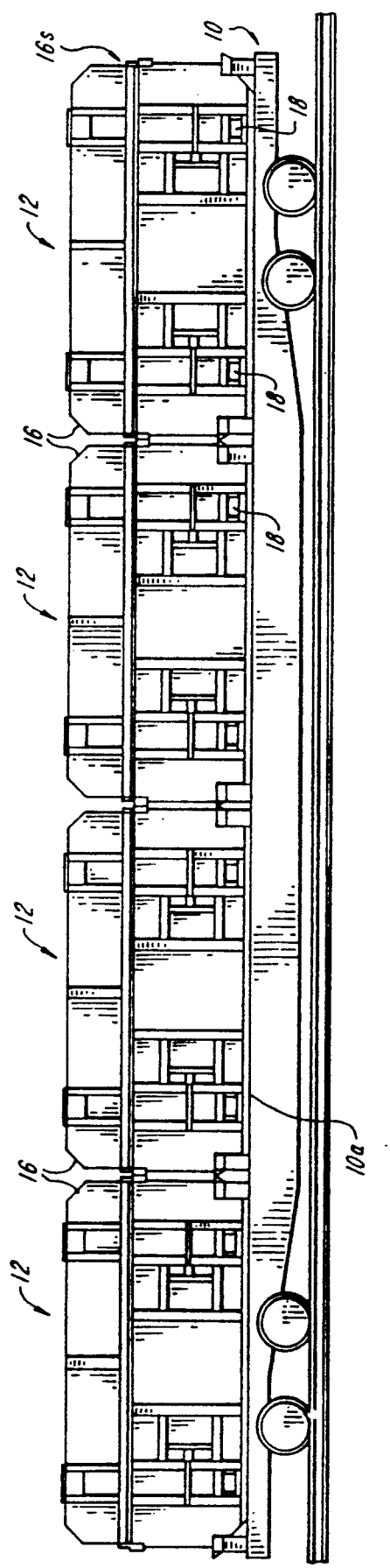
FIG. 1 is a a view in side elevation of a reinforced flat-bed railway car carrying four boxes with lids according to the present invention.

FIG. 1 shows a flatbed railway car 10 carrying four open-top boxes 12 located and passively restrained and the deck 10A of the car by four sets of corner guides 14. Each box holds a loose bulk material such as municipal solid waste (MSW) with its open top covered by a lid 16. A skirt portion 16s of the lid overhangs its associated box. The box has a pair of hollow, double open-ended pockets 18 that extend across the box and are open at both ends. The lids 16 also have a pair of hollow, double open-ended pockets 18 that extend across each lid with the same spacing a the pockets in the box. A mobile forklift 20 (FIGS. 11A-12) has a pair of forks 22 adapted to enter the pockets 18, 18 to couple the box or lid to the forklift. As shown in FIGS. 11A-11D, the forks 22, 22 enter the pockets 18,18 when the box is on the ground. The forklift then lifts the box raking it back to stabilize the load during travel, and then executes a 150° forward "roll out" motion in a vertical plane parallel to the forklift (from the position shown in FIGS. 11C to the position shown in FIG. 11D). This action of the forklift produces an "over-the-side" dumping of the MSW or other loose bulk material that is rapid and reliable. By engaging the pockets 18, 18 on the lid with its forks, the forklift can manipulate the lid to cover or uncover the boxes.

With particular reference to FIGS. 4-10, each box 12 is essentially an open-topped rectangular container including a floor 12a, side walls 12b, 12b and end walls 12c, 12c welded or otherwise secured to one another continuously at their adjacent edges for strength and to make the box liquid tight. It is significant that the box has no supports extending across its interior, such as a brace or tie rod extending between the side walls, which can impede the complete and rapid loading or unloading of the MSW, or other bulk materials, from the box. Such braces are also susceptible to bending or breaking from the load or mechanical impacts which can destroy the ability of the box so reinforced to withstand the force of the load during dumping. The box nevertheless has the structural strength, particularly at its side walls, to withstand the forces existing by loads as large as 35 tons, even as it is manipulated by the forklift 20 through a dumping motion which, during a portion of the motion, supports the box by gripping one side wall while the full weight of the load bears on the opposite side wall. The box 12 has no doors, hinges or other openings which must be opened, closed, latched, or unlatched on loading or unloading.

The box floor 12a includes a pair of corner sills 12d, 12d and a like pair of parallel, mutually spaced reinforcing sills 12e,12e, all of which extend longitudinally and the full length of the box, preferably an overall length of 21 feet. The sills 12d and 12e are preferably formed as hollow members with a generally square cross section of a suitable structural material such as ¼ inch thick steel plate. The hollow construction provides the required strength while reducing the weight and material costs of the box. The floor 12a also includes a floor plate 12f, e.g. a ¼ inch thick steel plate with a tensile strength of 50,000 lbs that is secured to the sills 12d and 12e, as by a continuous weld.

The side walls 12b, 12b, are each formed of a plate 12g, 12g, also of ¼ inch thick steel, or a suitable equivalent, that is continuously welded at its lower edge to one of the corner sills 12d and at its ends to an end plate 12h which in turn is continuously welded to them. A pair of hollow reinforcing ribs or "stakes" 24 straddle each pocket 18, and additional stakes 24a are located generally midway between the center-most "pocket" stakes 24 and the longitudinal midpoint of the side walls 12b, as shown. The stakes are standard channel steel members with a C-shaped cross-section which are then welded to the side plates 12f. Horizontally oriented stakes 12j of like construction further reinforce and protect the side walls immediately adjacent the pockets. Steel deflection plates 18a, also of ¼ inch steel, are positioned along the sides of each pocket to guide the forks 22 into the pocket and to protect the side walls 12f if they are speared by a fork which is not properly aligned with a pocket.

Horizontal stakes 12k extend between the vertical stakes 24 and 24a to strengthen the side wall at a gripping member 26. The gripping member is preferably a two inch diameter steel rod mounted between a set of laterally projecting mounting brackets 26a and a laterally projecting mounting bracket 26b secured to the stake 24 adjacent the end wall 12c. The member 26 is also welded to the outer surface of the adjacent stakes. Gripping occurs on the member 26 at a short portion 26c of the rod between the stake 24 and the one of the brackets 26a. The remaining portion of the member extending to the bracket 26b distributes the applied load during dumping over a larger portion of the box than merely the region immediately adjacent the portion 26c. A corner pocket 121 (FIG. 5) is welded on each corner of the box to the side and end plates to strengthen the corners.

Figure 7:
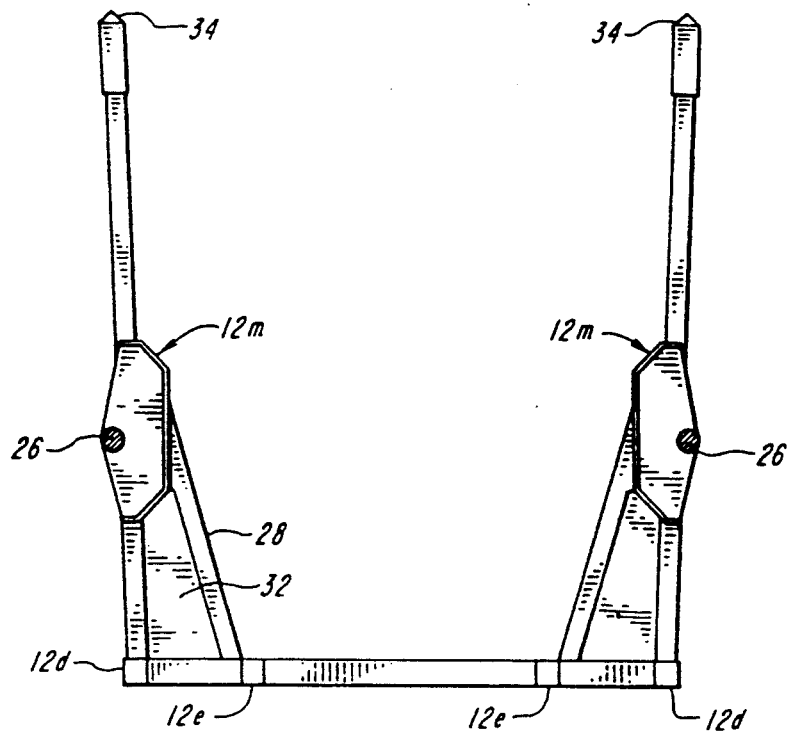
FIG. 7 is a view in vertical section along the line 7—7 in FIG. 6.
Figure 8:
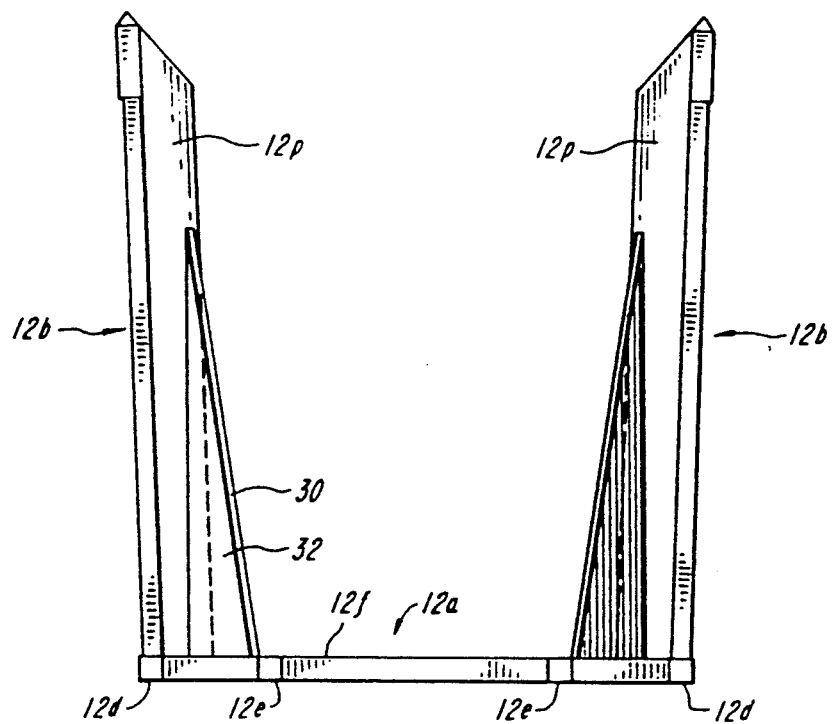
FIG. 8 is a view in vertical section along the line 8—8 in FIG. 6.

Reinforcement of the box also derives from a box-like construction of the pockets 18,18 (formed of plate steel or channel steel with a hollow, rectangular cross-section), internal reinforcing rods 28 and 30. The rods 28 extend from the floor plate 12f to the side wall 12b, or more specifically, to a recess cavity 12m secured in the wall plate 12g formed of sheet steel which provides a clearance around the gripping portion of the member 26, as shown in FIG. 7. The ends of the rods are welded to the plates 12g and 12m. Each reinforcing rod 28 ties the side wall to the bottom wall at a point adjacent one pocket 18 and one sill 12e. The rod 28 braces the side wall during dumping, particularly as the box is rotated from the portion shown in FIG. 11C to the position shown in FIG. 11D, or stated in other terms, it transmits forces applied to the side wall to the bottom wall and support structures connected to the bottom wall.

Figure 5:
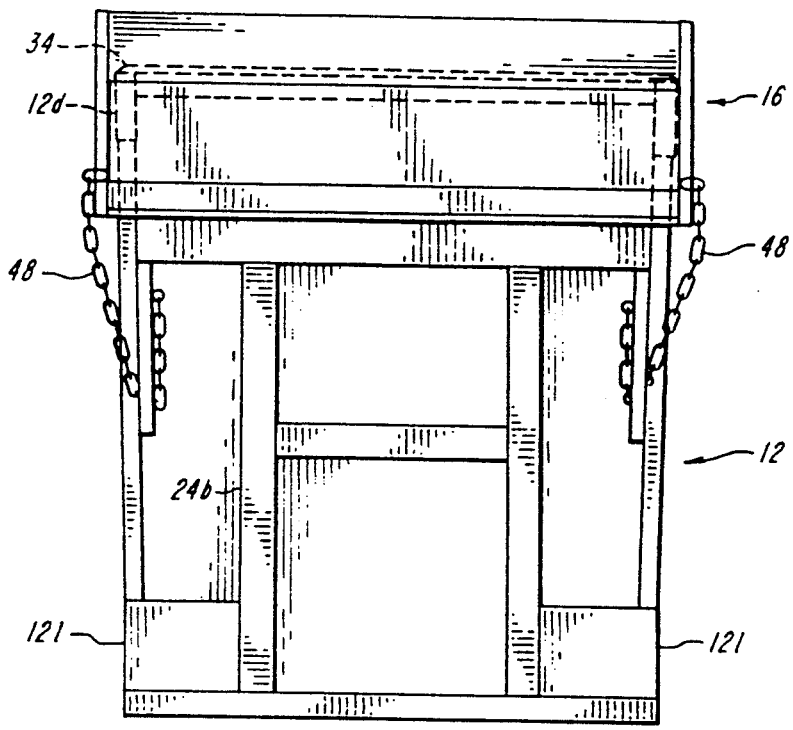
FIG. 5 is a end view in side elevation of the box and lid shown in FIGS. 1 and 4 with the lid seated on the box.
Figure 6:
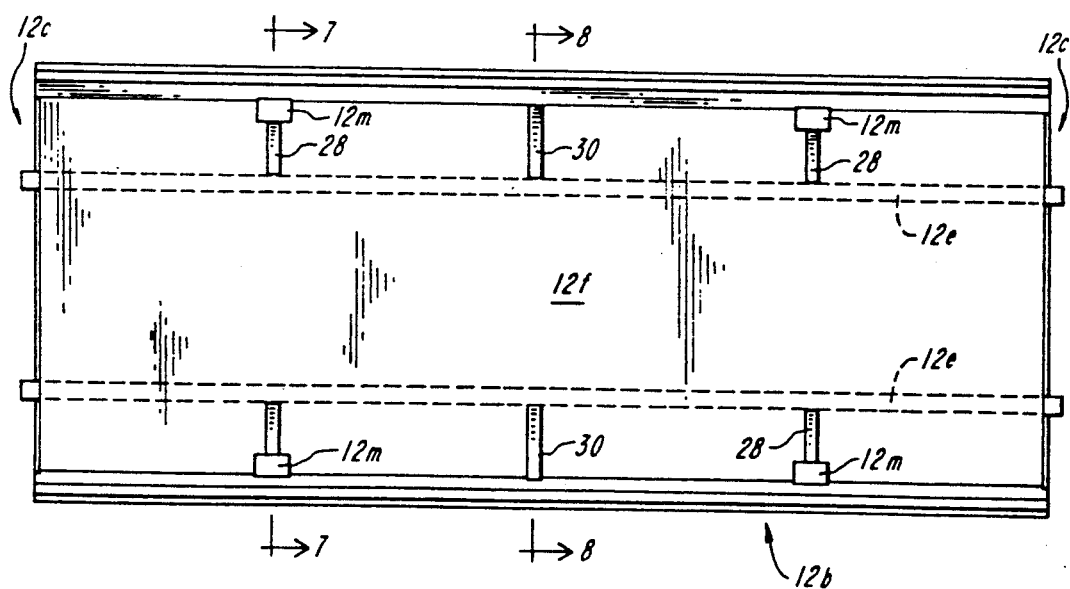
FIG. 6 is a top plan view of the box shown in FIGS. 1. 4 and 5.

The rods 30 extend from and are welded to the side and bottom plates 12b and 12f at a longitudinal midpoint of the box and at or near the sills 12e. The rods 30 may be omitted and the box will still have the required structural strength, and in the presently preferred steel box form, they are omitted. The upper end of the rod is secured to the side plate 12b through a vertical gusset plate 12p which is itself welded between the sie and bottom walls. Forces transmitted from the side wall by the rods 28,28 or 28,30 to the floor are resisted directly by the sills, and by the floor plate and other connected supporting structures. Each rod 28 and 30 is preferably a 1 inch diameter steel rod and has a steel skirt 32 that is secured between the rod and the box. The skirt prevents material carried in the box from lodging behind or around a rod so and thereby prevent this material from being dumped during unloading. The end walls 12c, 12c also have vertical stakes 24b in the end walls and a horizontal stake 12n extending between the vertical stakes (FIG. 5).

Figure 10:
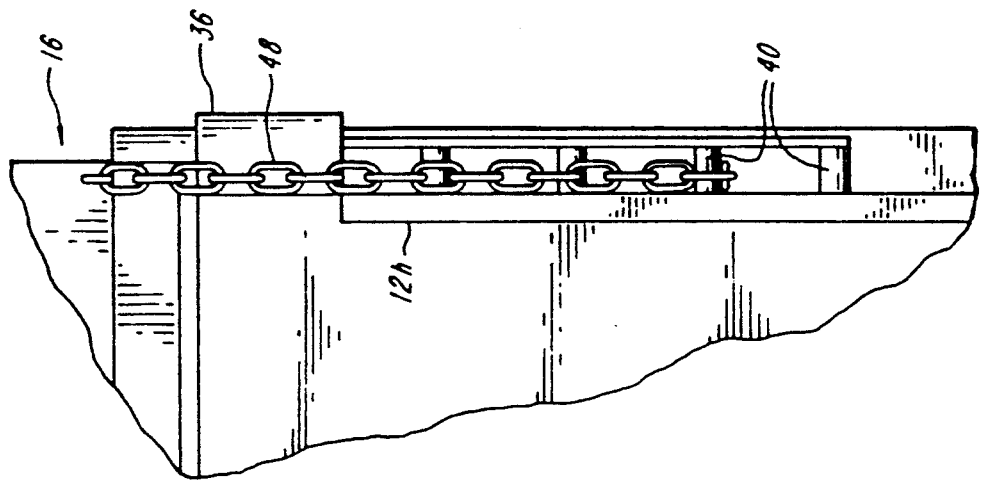
FIG. 10 is a detail view in side elevation of the adjustable lid restraint shown in FIG. 9.

The upper edge of the side and end walls is capped with a chisel-like force deflecting point 34 which guides the lid onto the box in a proper seated position (FIG. 5) and avoids the full weight of the lid from being carried by any one wall, which could occur if the lid and the upper edge of the box mated in an abutting relationship. The point 34 caps an upper horizontal stake 120 that is welded to and extends completely around the box. Because the box has no side with opens, this closed rectangular top staking provides significant structural reinforcement. The end walls 12c, 12c also carry a sill 36 that extends horizontally across the outer face of the end wall. The lower edge of the lid rests on the sill, as is best seen in FIG. 10. The sill 36 abuts the lower end of the lid to form a seal against an air flow under the lid, particularly the forward end of the lid with respect to the direction of travel of the railcar 10. This seal controls windlift that might otherwise cause the lid to fly off the box during transit, whether due to wind forces alone or a combination of wind forces plus the movements of the railcar.

The lid 16 is similar in construction to the box 12. It has a plate top 16a, side walls 16b, 16b and end walls 16c, 16c all welded continuously to one another, or formed integrally. A pair of double open-sided pockets 18, 18 are formed as rectangular channels adjacent the lid top 16a to allow the forks 22 to enter the pockets 18, 18 and manipulate the lid, in particular, to place it on the box after it is loaded with MSW and to remove it at a dump site prior to dumping the box. The pockets are reinforced by stakes 24c and a further reinforcing stake 24d runs across the lid at its mid-point. An edge rail 16d extends around the lower open end of the lid for reinforcement.

The lid skirt portion 16s formed by the side and end walls 16b and 16c overhangs and surrounds the open top of the box as shown in FIGS. 1, 5, 9 and 10. The position of the lid when it closes the box has the rail 16d resting on the sill 36 with a small clearance between the upper end of the box walls and the lid top 16a to accommodate an overfill of the box. The overlap between the lid skirt and the box walls is sufficient to ensure that the lid will stay on the box during transit despite wind and/or bouncing or other movements of the railcar. An overlap of at least 18 inches has been found to ensure that a 1,200 pound lid will remain on the box reliably without the use of positive restraints. Nevertheless, for additional safety, chains 48 can be used to secure the lid reliably even if the box is overfilled so that the lid rests on the MSW overfill, not on the sill 36. The overall height of the box when covered with the lid is about 10 feet.

Figure 9:
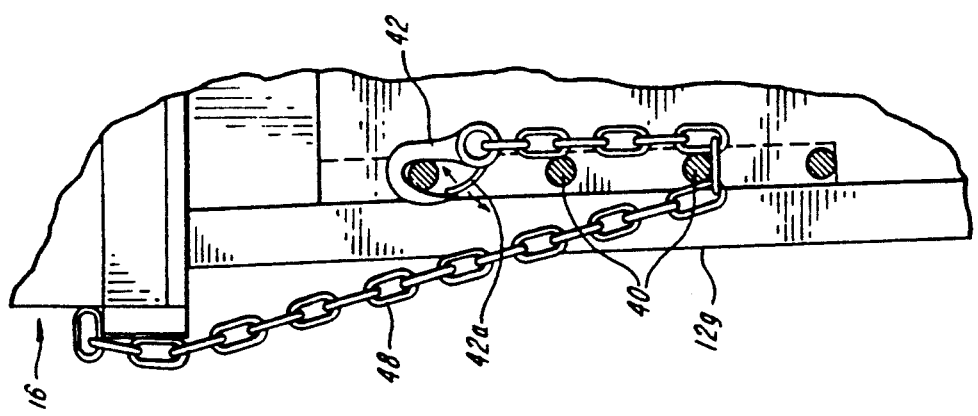
FIG. 9 is a detail end view in side elevation of the adjustable lid restraint.

As best seen in FIGS. 5, 9 and 10, one end of four chains are secured to the lid at each of its corners. Each chain wraps around one of a set of vertically arrayed, mutually spaced rods 40. A hook 42 secured at the free end of each chain engages another one of the rods 40 to secure the lid. The hook has a conventional spring loaded latch 42a to prevent the hook from disengaging the hook during handling or in transit. The vertical position of the lid with respect to the box is adjustable through a selection of the particular rods on which the chain is wrapped and hooked. The use of the chains 48 requires that personnel hook and unhook the chains after loading and before unloading. However, an advantage is that if the box is thrown from its carrier in an accident, its contents will not spill out of the container, thus reducing clean-up costs. This advantage is particularly important where the material being transported is harmful, or difficult to clean up. In any event, whether restrained or not, the lid prevents rain, snow, airborne debris, and the like from entering the box while holding the contents of the box within it, particularly during transport.

The box 12 is illustrated as having side walls that incline outwardly slightly. This arrangement may facilitate dumping, but the presently preferred construction is to have the side walls vertical. The box has an interior volume of approximately 63 cubic yards and can hold loads weighing up to about 35 tons. One railcar 10 carrying four boxes 12 typically can therefore transport more than 265 cubic yards of MSW weighing at least 88 tons. The reinforcing described above allows the boxes to carry this weight, even through the over the-side dumping. It is also significant that the box and lid have a generally sleek, uncluttered interior and exterior which facilitates loading, unloading and handling of the boxes.

Figure 11A:
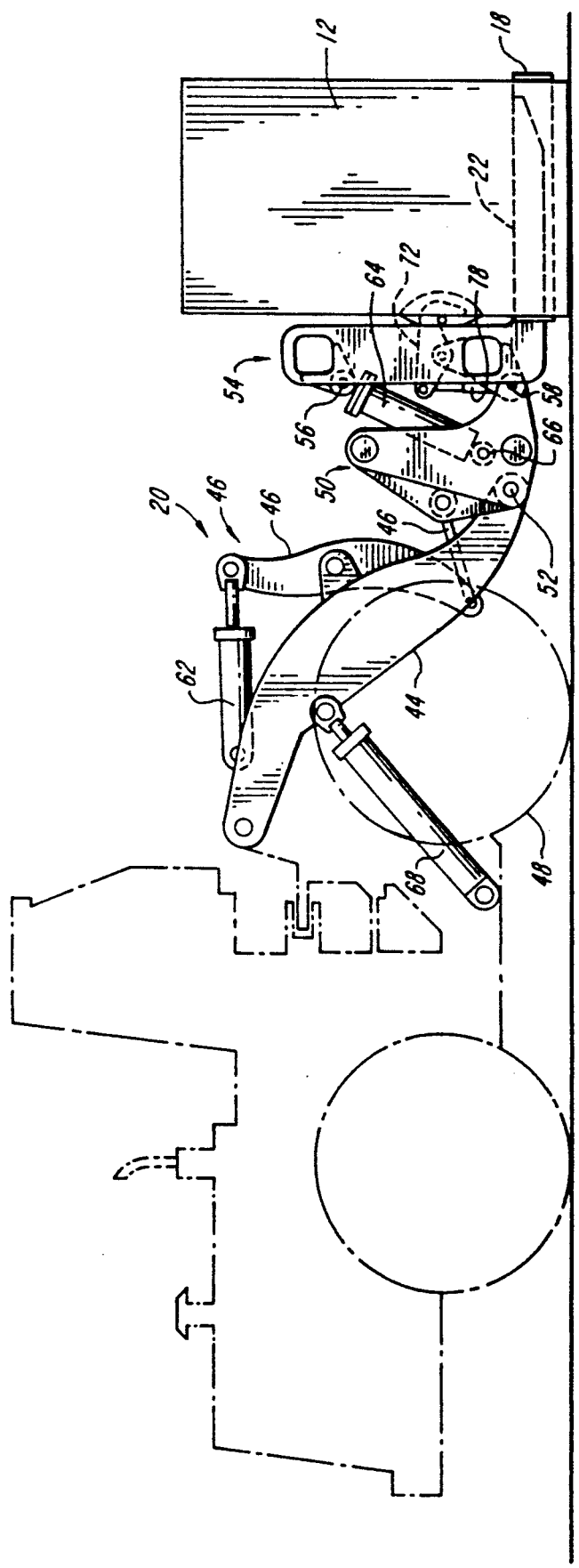
FIGS. 11A-11D are simplified views in side elevation of a forklift and box according to the present invention where
Figure 11B:
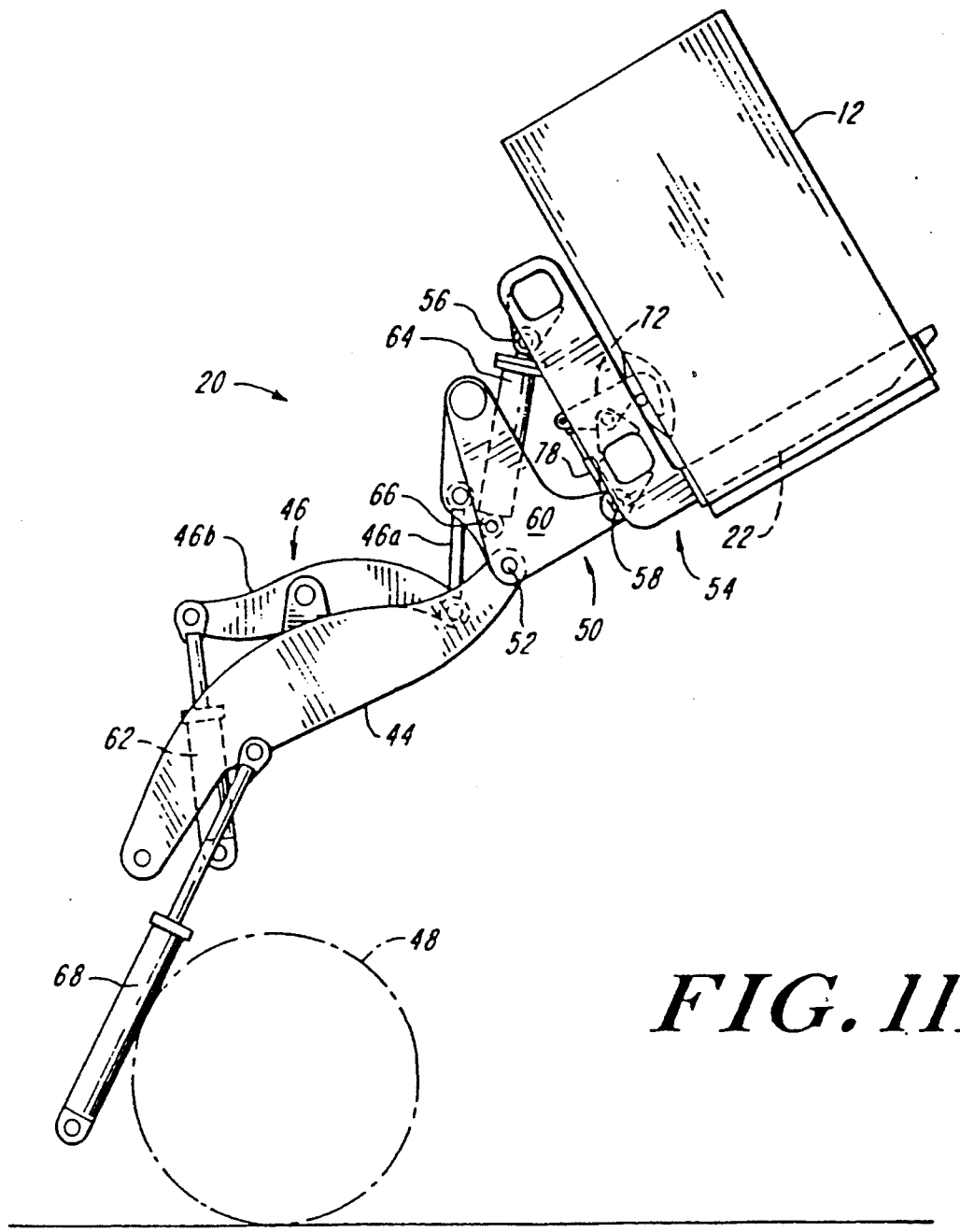
Figures 11C, 11D:
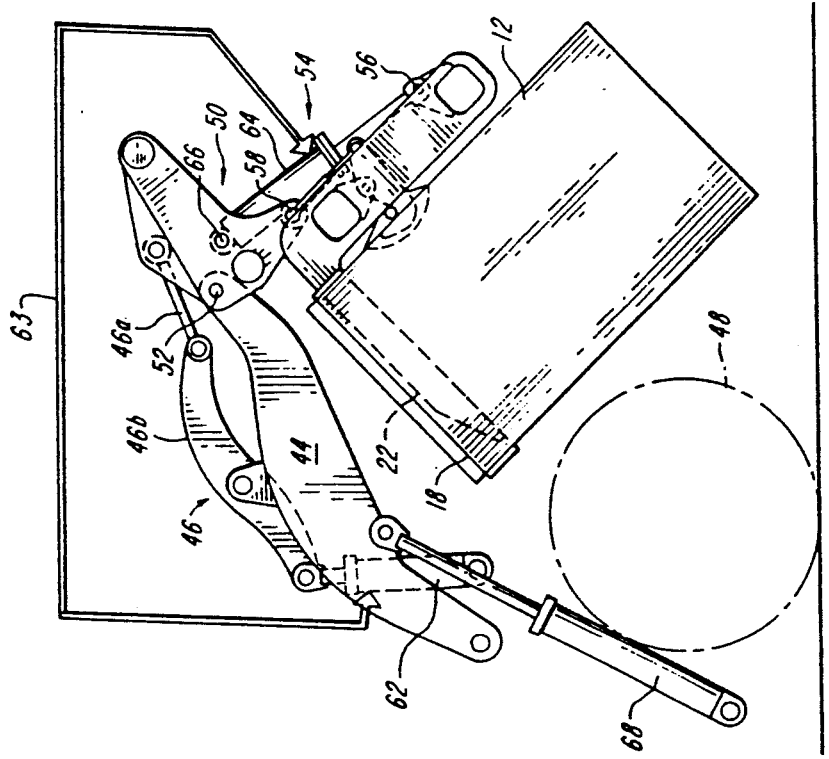
Figure 12:
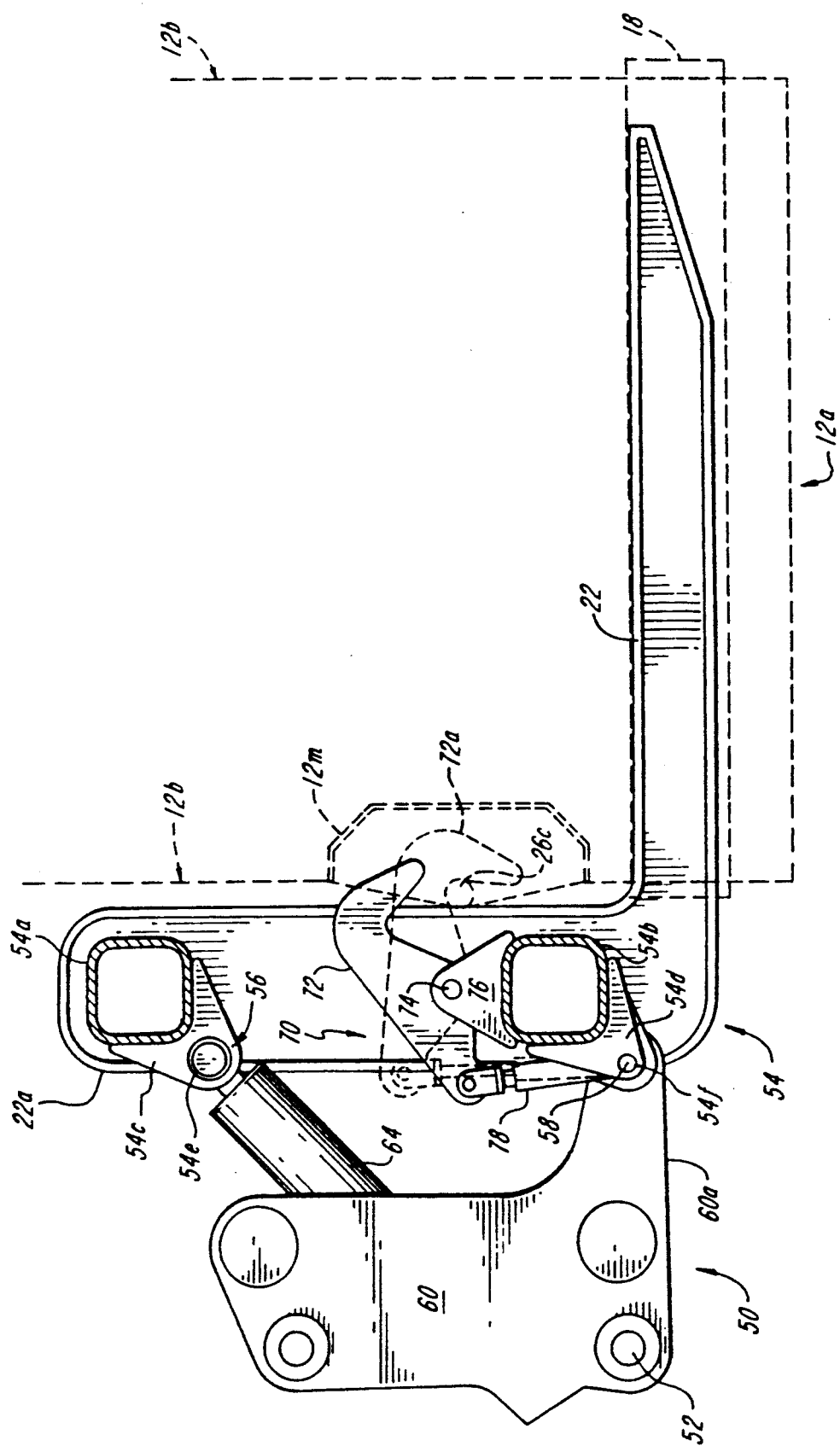
FIG. 12 is a detail view in side elevation and shown in FIGS. 11A-11D partially in section of the fork assembly, including the gripping arrangement to secure the box on the forks during the roll out movement.

With reference to FIGS. 11A–12, the forklift 20 is a heavy duty, self-propelled wheel loader such as the vehicle sold by Caterpillar, Inc. under the trade designation CAT 992C. The 992C has a conventional bucket attached at the front end of an articulated linkage including a set of lift arms 44,44 and a Z-bar linkage 46. The 992C weighs approximately 96 tons, with a conventional bucket. The center of gravity of the wheel loader, exclusive of the lift arms, associated hydraulic actuators and bucket, is set well behind a pair of front wheels 48. The 992C has a pair of rear wheels, an operator's cab, a diesel engine, and a hydraulic system, all of known construction. The engine is positioned to counterbalance the load.

The forklift 20 of the present invention differs from the CAT 992C wheel loader in the construction and operation of the articulated linkage and the working elements (the forks 22 and their mounting assembly) attached to the end of the lift arms 44,44, namely, a carriage assembly 50 pivotally mounted at 52 to the front end of the lift arm 44,44 and a fork group 54, including the forks 22,22, that is pivotally mounted to the carriage assembly 50 at pivots 56 and 58. In the 992C wheel loader, the bucket is mounted in a manner generally similar to that of the carriage assembly 50. A lower pivot is positioned at the end of the lift arms 44,44 and parallel spaced link arms 46a,46a of the Z-bar linkage pivotally connected between a upper pivot point on the 992C bucket and one end of parallel spaced tilt links arms 46b,46b also of the Z-bar linkage. However, the maximum angular travel of the bucket of the CAT 992C is not sufficient to rake back about 15° when the lift arms are raised and then rotate forward to produce about a 45° downward dump angle for a box. The backward rake of the forklift and the box carried by the forklift stabilizes the forklift sufficiently to allow safe travel. However, for over-the-side dumping the box should be angled at about 45°, and preferably 50°, to ensure a rapid and complete unloading. This requires a maximum angular travel of about 150° in the preferred form, which is not possible with the 992C construction.

To provide this large angular travel, the fork group 54 is pivotally mounted at 58 on forwardly extending legs 60a of generally L-shaped frame members 60 (preferably multiple such plates in a parallel spaced relation to provide additional strength and stability for the assembly). The carriage assembly itself pivots about 52 under control of a hydraulic tilt cylinder 62 acting through the Z bar linkage. In the preferred form the tilt cylinder can produce a rotation of the carriage assembly of about 50°. The rotation is used to rake the box 12 backwards 15° (FIG. 11B) and to then rotate it forward through the "horizontal" position shown in FIG. 11C to a forwardly tilted or "rolled-out" position with the carriage assembly in a maximum forward rotational position shown in FIG. 11D.

A feature of the present invention is that a further hydraulic cylinder, a "rotator" cylinder 64, is mounted on the carriage assembly between a pivot 66 and the pivot 56 to produce an additional forward roll out of the box through approximately an additional 100° of travel to the final dump position of FIG. 11D with the box in about a 50° downward inclination. It should be noted that in addition to rotating the box 12, the forklift 20 also causes the center of gravity of the box and its load to move laterally toward the forklift (compare FIGS. 11C and 11D). The cylinders 62 and 64 can act simultaneously, but preferably their hydraulic circuits are connected in series (shown schematically as line 63 in FIG. 11d) so that the rotator cylinder, in the dumping cycle of operation, is actuated only after the tilt cylinder has been fully actuated. The line 63 can be conventional 1 inch hydraulic hose lines secured along arms 44,44 between conventional fittings mounted on the cylinders so that as one cylinder reaches an extreme position and the hydraulic fluid pressure increases, the hydraulic fluid is automatically diverted through the hoses to operate the other cylinder. After dumping, they are operated in reverse order with the rotator cylinder rolling the fork group 54 backwards and then the tilt cylinder returning the carriage assembly (and the fork group and box carried on the fork group) to a generally upright position. It will be understood that the tilt cylinder is also operated in coordination with a main lift cylinder 68 that raises and lowers the lift arms 44,44, and therefore the box 12. The hydraulic circuit and controls for the lift and tilt cylinders are those conventionally used on the model 992C wheel loader, however, any of a wide variety of conventional hydraulic systems used on wheel loaders and like equipment are suitable.

The fork group 54 includes a pair of horizontal support members 54a 54b that support and bridge vertical legs 22a of the forks 22,22. The upper support 54a has a mounting bracket 54c that receives a pivot shaft 54e that defines the pivot 56. The lower support 54b has a similar mounting bracket 54d that receives a pivot shaft 54f that defines the pivot 58.

The fork group 54 also includes a pair of lock assemblies 70 each having a lock member 72 pivotally mounted on a shaft 74 secured in brackets 76 mounted to the lower support member 54b. One end 72a of the lock member has a hook-like configuration adapted to engage the gripping member portion 26c, as shown in FIGS. 11A–11D and in phantom in FIG. 12, when a hydraulic cylinder 78 pivotally mounted to the opposite end of the lock member 72 is actuated. In its opposite limit position the cylinder 78 draws the lock member into a release position shown in solid line in FIG. 12. When the fork assembly is "rolled-out" to the dump position, the locking assemblies prevent the box from sliding off the forks. As the box is dumped, the locking assemblies and the gripping members carry the full weight of the box and its load, which is "active" in that it is loose and shifts in response to the dumping movement, with a portion of the load beginning to empty even before the box and its contents are fully supported by the gripping members. In the release position, the hook-like end 72a clears the gripping member portion 26c to allow the forks to enter or withdraw from the pockets 18,18.

The flatbed railcar 10 is a Pullman F85-E which has additional reinforcing members, particularly cross ties, wide diameter (6.5 inches) axles and larger than usual (38 inch) wheels, all adapted to carry four boxes 12 fully loaded, a maximum weight of about 100 tons with an overall length of 85 feet and a gross weight of 263,000 lbs. Prior to the present invention no standard railcar could carry a load of this weight. Suitable such reinforced railway cars are manufactured by Railway and Industrial Services, Inc. of Joliet, Ill. Another significant feature of this invention is the passive restraint system provided by the corner guides 14 secured to the solid steel railcar deck 10a. The corners are each preferably L-shaped in horizontal section and extend vertically a sufficient distance that there is substantially no likelihood that the box will bounce upwardly out of the corner. Preferably each corner is formed of ¼ inch steel plate or the equivalent and extends vertically for eighteen inches measured from the upper surface of the deck 10a. The corner-to-box spacing is close, a typical separation being about 1 inch to avoid shifting of the load on the railcar and resist a tipping of the boxes as the railcar corners or sways. The upper ends 14a of each corner are flared outwardly, preferably at the rake back angle of the forklift, so that the box 12 carried by the forklift in the position shown in FIG. 11B readily seats in the corners and is guided by them into a seated carrying positon where the bottom face of the box is flush with the deck 10a and the corners 14 surround the adjacent corners of the box. In this relationship, the box is restrained from a lateral movement with respect to the railway car, but no latches, catches, ties or other active restraints are required.

The corners are secured to the deck preferably by welding in a manner which does not interfere with the flush abutment of the box with the deck to resist wind-lift problems, and to evenly distribute the weight of the boxes over the deck 10a. This passive restraint allows a simple "drop-in" loading of the boxes that is compatible with the manipulation of the boxes by the forklift 20, yet secures the boxes on the railcar against all but a severe crash or derailment. The passive restraint system of the present invention has successfully withstood a crash test of the railcar 10 carrying two fully loaded and two empty boxes and with the railcar traveling at 11 miles per hour, in satisfaction of safety standards of the Association of American Railroads.

Figure 2:
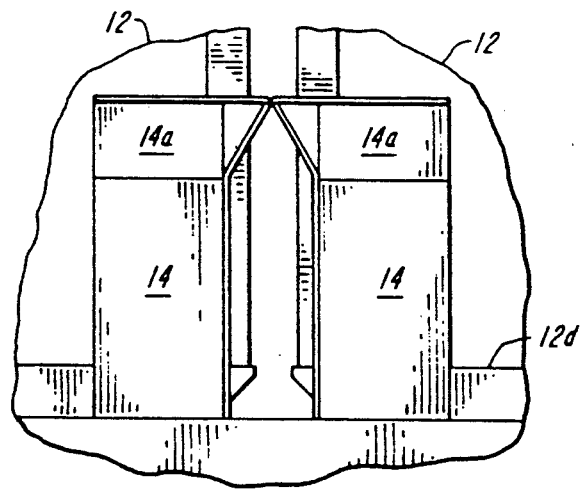
FIG. 2 is a detail view in side elevation of interior adjoining members of the passive restraint system shown in FIG. 1, also according to the present invention.
Figure 3:
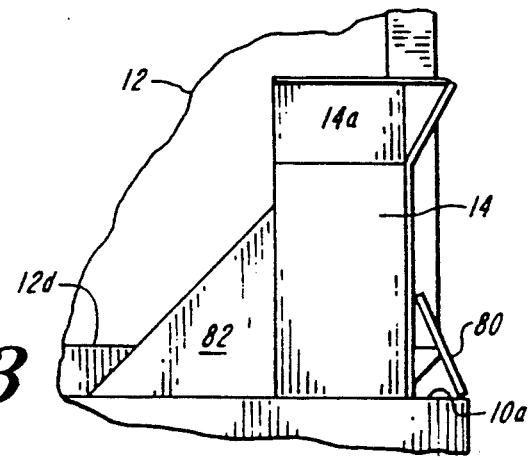
FIG. 3 is a detail view in side elevation of an end member of the passive restraint system shown in FIG. 1.
Figure 4:
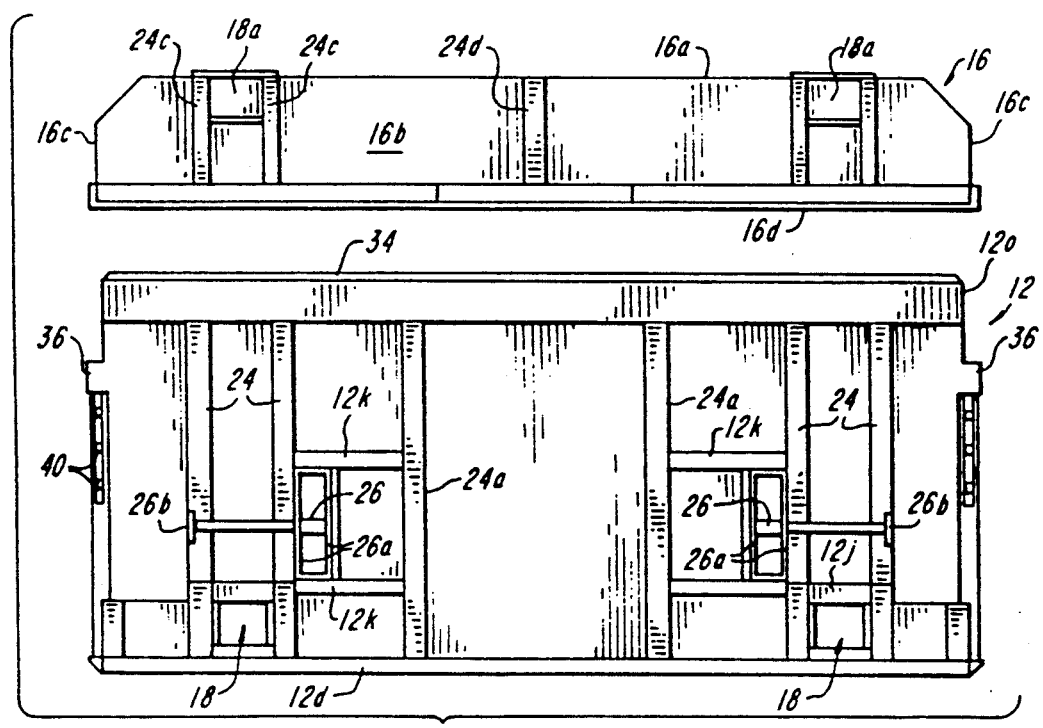
FIG. 4 is a view in side elevation of a box and lid according to the present invention with the lid removed from the box.

As is best seen in FIGS. 1-3, the corner guides 14 located at the end of the car are reinforced by a plate 80 welded at an angle between the corners 14 and the deck 10a and a gusset 82. The interior corners 14 are in a closely spaced relationship, as shown in detail in FIG. 2, to provide the most efficient packing of the boxes on the railcar 10. (Because the boxes are loaded onto the cars by a forklift that engages the boxes at their side, there is no need for space between boxes at their ends to attach hooks to lift the boxes or other manipulation arrangements.) Also, the ends of the sills 12d and 12e are angled at their lower ends 12q to facilitate hauling the boxes onto and off a flatbed truck 84 for highway transit.

Figure 13:
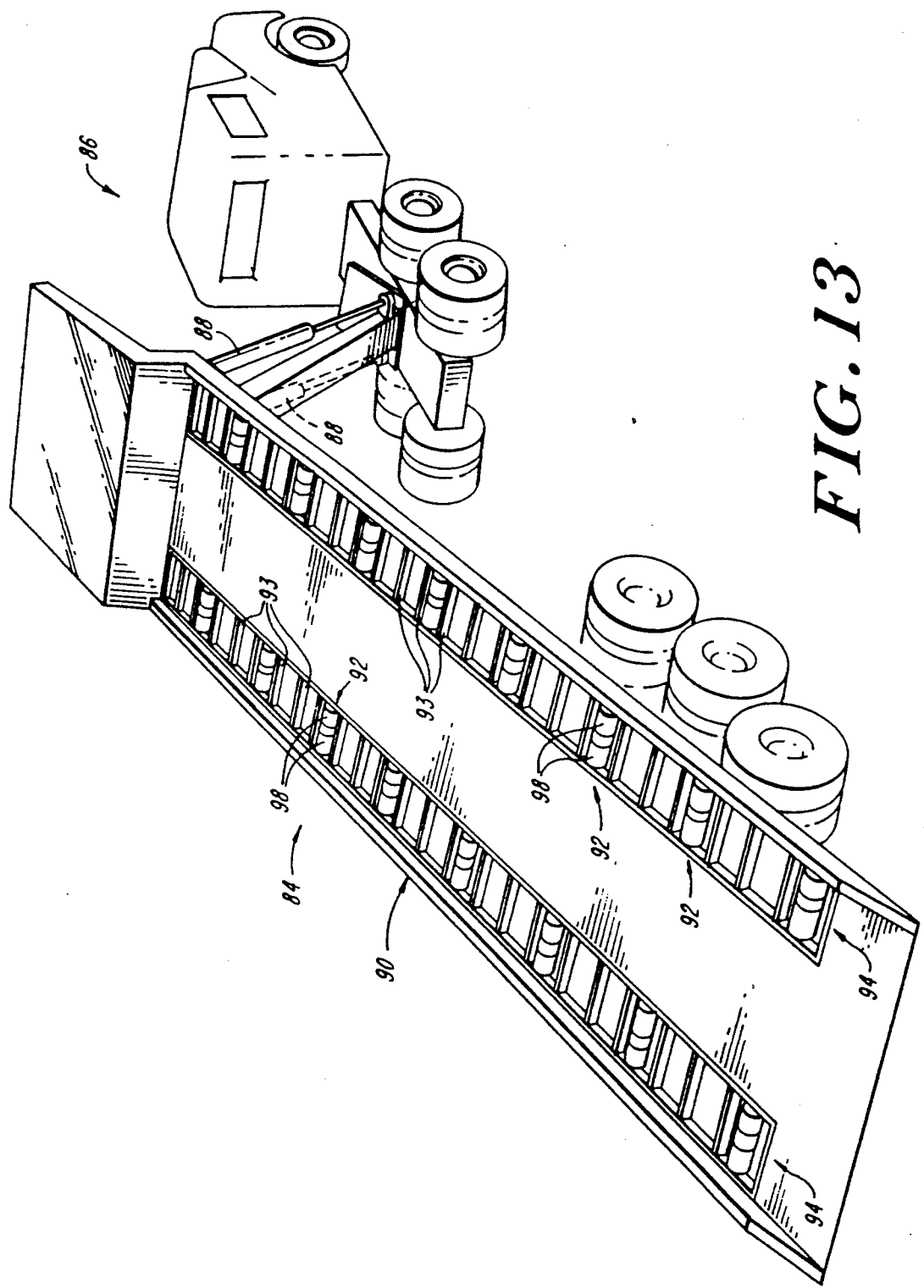
FIG. 13 is a view in perspective of a roller-bed trailer suitable for conveying the boxes of FIGS. 1 and 3-9 on highways.
Figure 14:
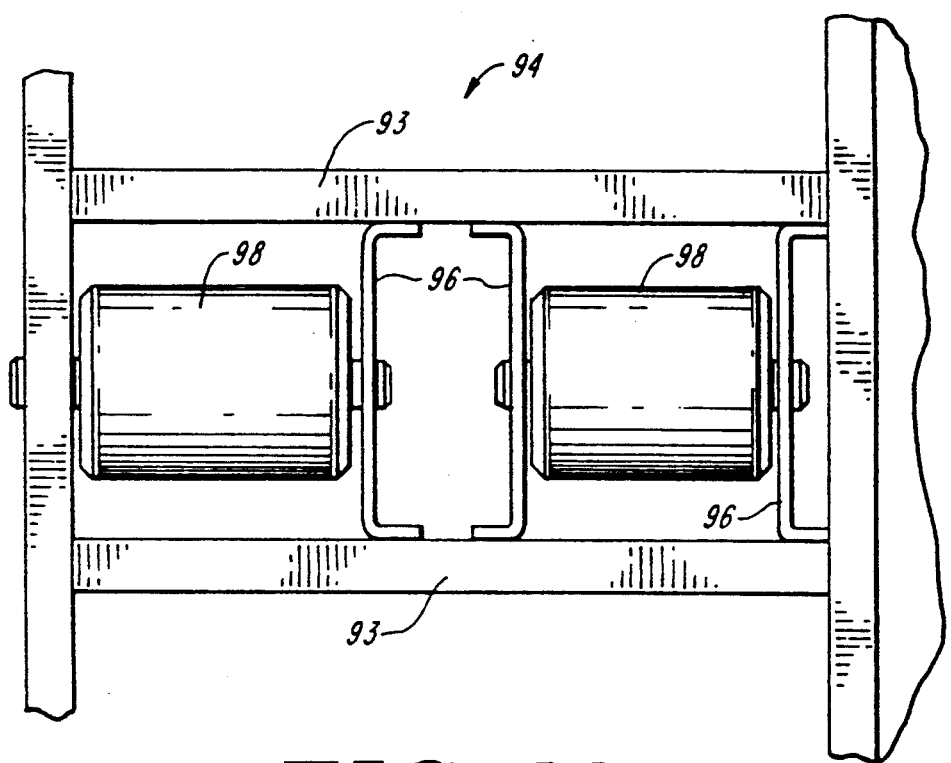
FIG. 14 is a detail top plan view of one of the roller assemblies shown in FIG. 15

FIGS. 13 and 14 illustrate a particular design of the truck 84 particularly adapted to hauling the boxes 12. The truck 84 is a modified tilt bed truck sold under the commercial designation Hauloll by Landoll of Marysville, Kans. A tractor 86 has a pair of hydraulic cylinders 88,88 that raise the front end of a flatbed trailer 90. The trailer has multiple axles, typically three axles near its rear end, disposed so that the weight of the trailer and its load is carried on all three axles when the trailer is loaded, but on only the rearmost one or two axles when it is raised.

In the raised position shown in FIG. 13, the rear edge of the trailer is adjacent the ground and the entire bed is a ramp with an inclination of about 22°. A winch (not shown) includes a steel wire cable that can reach the length of the trailer bed to hook onto a box and draw it onto the trailer.

To accommodate the unusually heavy weight of a loaded box 12, sets 92 of idler rollers are mounted in longitudinally extending openings 94,94 along both sides of the bed 84. Multiple cross braces 93 extend laterally across the openings 94 and support brackets 96 that in turn mount idler rollers 98 (One side of one roller is mounted directly into the frame of the bed.) The rollers are mounted so that they engage the lower surface of the box as it is drawn onto or off of the trailer by the winch, or under the influence of gravity. The trailer typically carries one box, which is secured on the trailer after it is loaded by chains or steel cables secured at one end to the trailer and hooked or latched at the other end to the box. A loaded box on the trailer has a total height of 13½ feet, which meets U.S. highway standards.

In operation, a box is placed at a MSW collection site where the MSW is loaded into the box by any convenient means such as a conventional wheel loader with a bucket which is also used to tamp down the material in the box to provide a more efficient packing. When the box is full, the forklift 22 engages the pockets 18,18 on the lid and places the lid on the box. It then positions its forks in the pockets 18,18 of the box, secures the locking assemblies 70, and lifts the loaded box and lid to the traveling position (FIG. 11B) The forklift then transports the box to a location where it can be loaded onto a truck 84 for highway transport to a railcar 10 or directly onto the railcar 10 if the collection site is serviced by rail. The box is lowered by the forklift until its lower corners seat in the funnel tops 14a,14a, and then the box is raked forward to a vertical orientation and lowered onto the deck 10a within four of the corners 14. The safety chains 48 may be hooked to secure the lid during transit, but the use of the chains is not necessary, particularly in the hauling of MSW.

Upon arrival at the dump site or an unloading terminal, another forklift 20 removes the boxes from the railcar and deposits them for hauling, storage, or temporarily sets them on the ground to remove the lid and then transport the opened boxes to a dump site. If the chains 48 were used, they are now unhooked and the lid removed from the box by the forklift. The box is dumped by the forklift in a 150° rotation in parallel with a longitudinal vertical plane of the forklift 20. The final dump position is shown in FIG. 11D. This motion results in a fast and complete unloading of the contents of the box. The box is then returned to a vertical position on the ground, the lid is placed back on it, and the box is returned, whether by rail, truck or a combination of rail and truck, to the original loading site.

Viewed as a process, the present invention involves the transportation of loose bulk material by loading the material into an open top container of high structural strength which is watertight and has no doors or other movable closures or associated latches. It also involves covering for the box to block the entry of water and to prevent the escape of the material during transit, where the covering is by a lid that overhangs the upper edge of the box. The process also includes manipulating the lid and the box with forks mounted on a mobile tractor, the manipulation including a 150° forward roll out of a loaded box from a raked back position for load stabilization to a 50° dump position. The process also includes providing a flatbed railcar and passively restraining multiple covered boxes on the railcar where the passive restraint involves a drop in loading/unloading of the box to and from the car with the bottom of the box flush with the deck of the railcar.

There has been described a bulk material transportation system that is simple, rugged, reliable, easy to use, has a competitive cost (both capital and operating), and which allows MSW and other loose bulk materials, particularly materials of low intrinsic value, to be shipped economically by rail while also being intermodal, that is, adaptable to transport over highways by truck. The system of the present invention features a rapid and convenient unloading of the bulk material from the container, as well as of the loaded container onto and off of a flatbed railcar. It provides large volume, extremely heavy cargoes to be hauled at tonnage levels heretofore unknown in the rail industry for this type of cargo. This system also hauls the material while protecting it from moisture and other environmental factors and protecting the environment against moisture leakage from the boxes or escape of material from the boxes during transit.

While the invention has been described with respect to its preferred embodiment, it will be understood that various modifications and variations will occur to those skilled in the art from the foregoing description and the accompanying drawings. For example, while the box has been described as made of steel, it can also be formed of aluminum, which while being a softer metal, is more resistant to cracking at welds due to the intrusion of moisture into the weld which then freezes and has significant weight advantages over steel. A significant advantage of the present invention is that the box can be constructed of aluminum and still withstand the substantial forces applied to it. In an aluminum form there are preferably two rods 28 and a central rod 30 each extending from the floor to a generally rectangular, vertically oriented gusset plate 12p. Another modification is that the reinforcing stakes can be located at the interior of the box. This provides the same walls strength while providing an increase in the interior volume (about 4 cubic yards) available for a given set of maximum exterior dimensions (21 feet long by 10 feet high by 8 feet wide).

It will also be understood that the corners can have various forms such as a rounded corner or any of a variety of other shapes as long as they restrain the boxes and are structurally strong enough to withstand the weight of a loaded box that may accidentally be lowered onto the corner, rather than within it. Further, while the lid has been described as one with pockets and an overhanging skirt, it is within the scope of this invention to manipulate the lid using openings formed in raised brackets extending from the lid and to seat the lid within the box, although this arrangement will be more susceptible to the entry of moisture into the box, even if drain holes are provided in the box walls. Still further, regular flatcars can be used, with a significant attendant loss in carrying capacity, and the boxes can, of course, be made in different dimensions, with trade offs of carrying capacity against the ability to withstand the weight and be manipulated by the forklift 20. These and other variations and modifications are intended to fall within the scope of the appended claims.

What is claimed is:

1. A system for transporting and unloading a load of up to 35 tons of bulk material comprising,
   an open-top box having
   (i) a bottom wall and two side walls and two end walls rigidly interconnected with one another to hold said bulk material and to be watertight,
   (ii) reinforcing means secured to said side walls to enable said side walls to resist deformation due to the load of the bulk materials held in said box,
   (iii) at least one open-ended channel formed in said box adjacent said bottom wall that extends horizontally between said side walls and is generally aligned with said reinforcing means
   a tractor extending from a rear end to a front end and having
   (i) a fork group comprising at least one fork adapted to engage said at least one open-ended channel
   (ii) an articulated frame mounted on the front end of said tractor including first arm means, a carriage assembly mounted at the front end of said first arm means to rotate about a first axis of rotation, said fork group mounted on said carriage assembly to rotate about a second axis of rotation that is displaced forwardly of said first axis of rotation,
   (iii) a plurality of hydraulic actuators for said articulated frame to raise, lower, and rotate said at least one fork and said box carried on said at least one fork, and
   (iv) said articulated frame and said plurality of hydraulic actuators rotating said carriage assembly and said fork group forwardly about said first and second axes through an angular travel of at least 145° to place said box in a dumping position with said open top facing downwardly while moving the box backwardly in coordination with said forward rotation, and
   said tractor and said box having mating, selectively operable locking means to retain said box on said forks during said rotation to said dumping position, said locking means being generally aligned with said at lest one open-ended channel and said reinforcing means and including grippable members mounted on said side walls.

2. A system according to claim 1 further comprising a lid that has a skirt which surrounds said box adjacent its open top and overhangs said box when said lid is seated on said box to resist windlift.

3. A system according to claim 2 wherein said articulated frame rakes backwardly after engaging and lifting said box with said forks to shift the center of gravity of the box toward said tractor.

4. A system according to claim 2 wherein said lid has at least fork-receiving channel.

5. The system according to claim 2 wherein said box includes a rail that extends around the top of said box at its upper edge.

6. The system according to claim 5 wherein said upper edge of at least said end walls includes a sill with an upwardly directed, chisel-like configuration that engages said lid to seal said lid against wind lift forces more effectively.

7. A system according to claim 1 wherein said selectively operable locking means includes hydraulic lock means mounted on said frame that releasably grip said grippable members to retain said box on said at least one fork during said rotating to said dumping position.

* * * * *